Patented June 24, 1947

2,423,045

UNITED STATES PATENT OFFICE 2,423,045

LIQUID PHASE CATALYTIC REACTIONS OF HYDROCARBONS

Herbert J. Passino, Englewood, and John S. Rearick, Short Hills, N. J., assignors to The M. W. Kellogg Company, Jersey City, N. J., a corporation of Delaware No Drawing. Application September 4, 1943, Serial No. 501,338

19 Claims. (Cl. 196—54)

This invention relates to improvements in methods for carrying out liquid phase catalytic reactions which involve the use of a reactant or a catalytic agent which is immiscible with another reactant or catalytic agent to be used in the reaction. More particularly the invention relates to improvements in carrying out liquid phase catalytic reactions of organic reactants at least one of which is immiscible with the other reactant or with a catalytic agent employed in promoting the reaction. Still more particularly the invention relates to improvements in carrying out catalytic hydrocarbon reactions which involve the use of catalytic agents which are immiscible with the hydrocarbon reactants.

It is an object of this invention to provide an improved method for carrying out liquid phase catalytic reactions in which the reactants and catalysts, which comprise at least two ingredients which are immiscible ordinarily, are brought into contact as components of a liquid homogeneous mixture. Other objects and advantages of the invention will be made apparent by the following description:

In carrying out the improved process of this invention the reactants and the catalyst are dissolved in a solvent consisting essentially of one or more fluorocarbons. The term "fluorocarbons" is employed here, and hereafter in the specification and claims, as inclusive of compounds consisting entirely of carbon and fluorine, which may be designated specifically as carbon fluorides, or compounds which consist entirely of carbon and halogen atoms in which the halogen atoms include at most minor proportions of atoms other than fluorine, which may be designated as completely halogenated hydrocarbons, or substantially completely halogenated hydrocarbons which contain only a minor proportion of hydrogen, e. g. less than two weight per cent. To illustrate the scope of the foregoing definition of the term "fluorocarbons" the following may be referred to as examples:

$C_7F_{16}$, $C_6F_{12}Cl_2$, $C_7F_{12}H_4$, $C_7F_{12}Cl_2H_2$

Among the compounds embraced in the above definition of "fluorocarbons" the compounds consisting entirely of carbon and fluorine, or carbon fluorides as they will be designated hereafter, are preferred for the purposes of the invention. The carbon fluorides are more stable, are less reactive with the catlaysts and reactants ordinarily employed and possess greater solvent power for such reactants and catalysts, than do the completely halogenated hydrocarbons which include halogen atoms other than fluorine. The latter in turn are preferred to partially halogenated hydrocarbons which contain hydrogen atoms. The use of fluorocarbons other than carbon fluorides in this invention represents a compromise between the desired ideal condition and the difficulty of preparation of completely fluorinated hydrocarbons, or carbon fluorides. Completely halogenated hydrocarbons containing a minor proportion of halogen atoms other than fluorine result from the fluorination of alkyl halides which may be effected more easily than the complete fluorination of hydrocarbons.

The fluorocarbons may be prepared by the fluorination of hydrcarbons having the desired number of carbon atoms per molecule by contacting the hydrocarbons with various metallic fluorides and elementary fluorine or by contact with certain fluorides alone. Cobalt difluoride, $CoF_2$, for example, can be used in conjunction with $F_2$ to fluorinate organic derivatives or the more reactive trifluoride of cobalt, $CoF_3$, is, by itself, suitable as a fluorinating agent. In the latter case, however, the $CoF_3$ must be regenerated with $F_2$. The presence of many other fluorides may serve as intermediates to promote the formation of fluorocarbons from hydrocarbons and fluorine. Silver fluoride with $F_2$, or the subfluoride of silver, $AgF_2$, are especially desirable in carrying out certain fluorinations. Among other metals whose fluorides, either in ordinary or extraordinary valence states, function beneficially in catalytically promoting fluorinations are: Hg, Cd, Zn, Mg, Be, Cu, Tl, Ti, Zr, Hf, Sn, Pb, As, Bi, Sb, Ta, Cr, Se, Mo, Te, Mn, Fe and Ni. The fluorocarbons, particularly carbon fluorides, may also be prepared by direct reaction of fluorine and carbon under suitable conditions and in the presence of a catalyst, such as mercury.

For example compounds consisting of carbon and fluorine, that is carbon fluorides, which are normally liquid and which have five or more carbon atoms per molecule are prepared by contacting carbon, such as activated charcoal or sugar charcoal, which is impregnated with mercury or a mercury salt and which is heated to a dull red heat, with gaseous fluorine.

The invention has particular application in carrying out organic reactions which involve the use of catalysts comprising inorganic halides, such as hydrogen halides and metal halides, inasmuch as these catalytic agents generally are insoluble in or immiscible with the reactants entering into the catalytic reaction. The invention has particular application in carrying out catalytic reactions of hydrocarbons in the liquid phase since such reactions ordinarily involve the use of catlaysts which are substantially immiscible with, or substantially insoluble in, the liquid hydrocarbons. The invention has particular application to catalytic liquid phase hydrocarbon reactions in the presence of catalytic agents comprising inorganic halides since the latter are ordinarily substantially insoluble in, or immiscible with, the hydrocarbon reactants.

The expression "catalytic inorganic halides" includes the hydrogen halides and metal halides, and combinations or mixtures of these, which are effective in promoting various hydrocarbon transformations or reactions. These include principally the halides of zinc, beryllium, boron, aluminum, tin, zirconium, titanium, tantalum, antimony, magnesium and iron, and the hydrogen halides, for example, zirconium chloride, zinc chloride, zinc fluoride, beryllium chloride, boron fluoride, aluminum chloride, aluminum bromide, aluminum iodide, stannic chloride, zirconium tetrachloride, titanium chloride, antimony chlorides, ferric chloride and hydrogen fluoride. In certain of the hydrocarbon reactions, notably those involving isomerization, mixtures of metal halides and hydrogen halides are employed. For example in the isomerization of paraffin hydrocarbons aluminum chloride generally is used in combination with hydrogen chloride, and hydrogen fluoride and boron tri-fluoride are used in combination.

The hydrocarbon reactions which may be carried out in accordance with this invention include principally those which involve the shifting of alkyl groups to effect isomerization, those which involve condensation, either ring closure (intramolecular), or intermolecular, and those which involve splitting of hydrocarbon molecules by breaking a bond connecting two carbon atoms. The isomerization reactions include the conversion of straight chain paraffin hydrocarbons or slightly branched paraffin hydrocarbons to highly branched paraffin hydrocarbons and the isomerization of poly-alkylated cyclic hydrocarbons such as poly-alkylated aromatic hydrocarbons by shifting of the alkyl groups on the benzene ring. The condensation reactions include the alkylation of isoparaffin hydrocarbons and aromatic hydrocarbons by reaction thereof with olefin hydrocarbons and the polymerization of olefin hydrocarbons. These condensation reactions may be defined broadly as the condensation of an olefin hydrocarbon with a non-olefin hydrocarbon. Alkylation also may be effected with alcohols, ethers, ketones, etc. The splitting, or cracking, reactions involve the conversion of relatively high boiling hydrocarbons, such as the constituents of gas oil, to lower boiling hydrocarbons suitable for use in gasoline motor fuel.

The fluorocarbon solvent is selected principally by reference to its boiling characteristics in relation to the boiling characteristics of the hydrocarbon reactants and products. The solvent may consist of a single fluorocarbon or may include a plurality of fluorocarbons boiling over a relatively wide boiling range. Ordinarily, however, it is preferred to employ a single fluorocarbon or a close-boiling mixture of fluorocarbons as the solvent. For example, in the isomerization of paraffin hydrocarbons it is desirable to employ a fluorocarbon, or a mixture of fluorocarbons, which boils substantially below or above the boiling points of the hydrocarbon reactants and products since this facilitates separation of the hydrocarbon product from the solvent. In the alkylation of isoparaffin hydrocarbons by means of olefin hydrocarbons it may be desirable likewise to employ a relatively high boiling solvent as this facilitates separation of the catalyst and hydrocarbon product and permits autorefrigeration of the reaction zone by evaporation of a portion of the hydrocarbon reactants. In this reaction as in the other condensation reactions it may be desirable to employ a fluorocarbon solvent which boils above the boiling point of the reactants and below the boiling point of the condensation products. Alternatively in reactions involving the recycling of a substantial quantity of a readily separatable hydrocarbon reactant, such as the alkylation of aromatic hydrocarbons with olefins, it may be desirable to select a fluorocarbon solvent boiling approximately in the boiling range of the aromatic hydrocarbon to be recycled. In such manner the catalyst and recycled hydrocarbons may be separated and returned to the reaction zone as a single fraction, the alkylated product and the unreacted low boiling hydrocarbons being recovered as separate fractions.

An important application of the improved process involves the liquid phase isomerization of paraffin hydrocarbons. The hydrocarbons to be isomerized include normal butane and normally liquid normal paraffin hydrocarbons and slightly branched normally liquid paraffin hydrocarbons. The normal butane is treated ordinarily to produce isobutane for use as a starting material in the production of iso-octane, by the alkylation of the isobutane with butylenes. The normally liquid paraffin hydrocarbons are treated ordinarily as a mixture. Such mixtures may be separated by fractionation from natural gas or from crude petroleum oil. An example of such a mixture is the material ordinarily designated as "mixed hexanes" or "refinery hexanes" which is a relatively narrow-boiling fraction of paraffin hydrocarbons having about six carbon atoms per molecules. The degree of isomerization of refinery hexanes, and other similar fractions, which is accomplished is measured ordinarily by the improvement in the anti-knock value of the product as compared to the starting material.

Isomerization reactions are effected readily by the aluminum chloride-hydrogen chloride catalyst or by the boron fluoride-hydrogen fluoride catalyst. For example a solvent consisting essentially of carbon fluorides such as $C_{10}F_{22}$ and containing 1–20% of aluminum chloride dissolved therein may be used. Depending on the degree of isomerization desired small amounts of hydrogen chloride may be employed in the solution. The solution may be mixed with an equal proportion of refinery hexanes under suitable reaction conditions to effect isomerization of the paraffin constituents to highly branched products. Such a mixture may be brought together at a temperature of 50 to 500° F. under pressures effective to maintain liquid phase conditions for a reaction period of 1 to 60 minutes to effect substantial isomerization of the hydrocarbon mixture, as reflected by a substantial increase in the anti-knock value of the hydrocarbon mixture. The solution, which contains the hydrocarbon reaction product and the catalyst, is then separated by fractionation into a hydrocarbon fraction and a fluorocarbon fraction containing the catalyst. The fluorocarbon fraction is then reused for the treatment of additional hydrocarbon reactants. Prior to such reuse a portion of the fluorocarbon-catalyst solution may be treated, as by distillation to remove therefrom any high boiling complexes to prevent the accumulation of such deleterious materials in the reaction zone.

Similarly the refinery hexanes may be treated with a fluorocarbon solvent-catalyst solution containing 1 to 50% of hydrogen fluoride and 3 to 5% of boron tri-fluoride. This solvent-hydrogen fluoride solution is mixed with the hydrocarbons and the resulting solution is maintained at a temperature of 50 to 500° F., under a pressure effective to maintain liquid phase conditions, for a time of 1 to 60 minutes.

The contact of the hydrocarbons with the solvent-catalyst solution may be effected in batch operations or they may be charged continuously to a suitable reaction zone from which a portion of the resulting solution, including reaction product, is withdrawn continuously with continuous recycling of the solvent-catalyst solution. It may be necessary to replace in the solvent-catalyst solution a small amount of relatively volatile catalytic materials which may be evaporated overhead in fractionating the product. For example it may be necessary to replace in the recycled fluorocarbon-aluminum chloride solution a small amount of hydrogen chloride. Similarly it may be necessary to add to the recycled fluorocarbon-hydrogen fluoride solution a small amount of boron tri-fluoride.

The alkylation of isobutane by olefin hydrocarbons such as propene and the butenes may be effected by contacting the hydrocarbon reactants in suitable ratio with a solvent-catalyst solution consisting of a fluorocarbon solvent essentially comprising $C_8F_{18}$ and containing dissolved therein 10 to 50% of hydrogen fluoride. The hydrocarbon reactants preferably are supplied to the reaction zone, and maintained therein, in as high a ratio of isobutane to olefins as is practicable and economical. This ratio should be at least 2:1 and preferably 10:1 or higher. The hydrocarbons and solvent-catalyst solution may be mixed and passed continuously through a reaction zone, such as a pipe coil, or a relatively large body of the mixture may be maintained with continuous addition of fresh reactants and solvent-catalyst solution and continuous withdrawal of a portion of the complete solution for separation of the reaction product and catalyst. The latter is then recycled to the reaction zone for further use. In the last-mentioned method mild agitation of the reaction mass may be desirable. These alkylation reactions are carried out preferably at relatively low pressure such as 25–150 pounds per square inch and at relatively low temperatures such as 0°–150° F.

In the alkylation of an aromatic hydrocarbon such as benzene by an olefin hydrocarbon such as propene the reactants may be contacted with a solvent-catalyst solution consisting of a fluorocarbon solvent comprising essentially $C_8F_{18}$ and containing 5 to 50% of HF and 1 to 10% $BF_3$. As in the alkylation of isoparaffin hydrocarbons, the ratio of the benzene to propene in the reaction zone should be maintained as high as is practicable or economical to promote the alkylation reaction in preference to other condensation reactions. The solution produced by mixing the hydrocarbon reactants in the proper ratio with the solvent-catalyst solution may be passed through a suitable reaction zone such as a pipe coil or a relatively large body of reaction solution may be maintained with continuous addition of fresh reactants and solvent-catalyst solution and continuous withdrawal of a portion of the reaction solution for separation of reaction products and the recovery of solvent-catalyst solution for recycling. In this particular reaction unconverted low boiling hydrocarbons such as any propane which may accompany the propene reactant is separated as an overhead in the fractionation step and the alkylated reaction product, which is principally cumene and higher boiling aromatic hydrocarbons, is separated as a bottoms product. An intermediate fraction containing the solvent-catalyst solution and the benzene which is to be recycled also is separated in the fractionation zone and this fraction may be recycled as such directly to the reaction zone.

In carrying out this reaction, as well as in carrying out other exothermic condensation reactions, the reaction temperature may be controlled by indirect heat exchange by suitable means provided in the reaction zone or a portion of the hydrocarbon reactants may be permitted to evaporate to effect cooling of the reaction mass by autorefrigeration. This method of temperature control is useful particularly in operations in which the reactants are maintained as a relatively large mass in the reaction zone. For example in the alkylation of isobutane the reaction zone may be maintained at the desired temperature level by permitting evaporation of a portion of the isobutane reacants and accompanying hydrocarbons such as normal butane. In the alkylation of benzene by means of propene temperature control may be effected conveniently by permitting evaporation of low boiling hydrocarbon reacants such as propylene and accompanying propane. Any desirable reactants which are evaporated by this method of temperature control are removed from the reaction zone, condensed and returned for further processing.

The polymerization of olefin hydrocarbons, such as the conversion of propene and the butenes to dimers and trimers thereof or the interpolymerization of these olefins, may be effected by contacting the olefin reactants with a fluorocarbon solvent containing dissolved therein a catalyst for such reactions. For example a hydrocarbon mixture, such as refinery gases, containing olefins suitable for conversion to gasoline constituents, may be dissolved in a solvent-catalyst solution consisting of a solvent comprising essentially $C_6F_{14}$ which has dissolved therein 1 to 10% of boron tri-fluoride or 5 to 50% of hydrogen fluoride. The resulting solution is maintained at a temperature of 100–600° F. under a pressure at least high enough to maintain liquid phase conditions for a time of 1–10 minutes. This reaction is effected suitably by passing the solution containing the catalyst and reactants through a pipe coil with indirect heat exchange to maintain the reaction temperature at the desired level.

The cracking or splitting of high boiling hydrocarbons such as gas oil may be effected with the same catalysts as are employed for the polymerization of olefin hydrocarbons but at somewhat higher temperatures. For the cracking reaction, however, the fluorocarbon solvent may be selected for the relation of its boiling characteristics to those of the hydrocarbon reactants and hydrocarbon products to facilitate separation of the latter. For example the gas oil may be treated with the catalyst in a solution in which the solvent consists essentially of carbon fluorides in the boiling range of $C_{16}F_{34}$. The solution formed by mixing the gas oil with such a solvent containing 1 to 10% of boron tri-fluoride or 2 to 20% of aluminum chloride is passed continuously through a heated pipe coil at a temperature of 100–600° F. to effect the desired degree of cracking of the gas oil. The reaction mixture emerging from the pipe coil is continuously fractionated to separate a light hydrocarbon product boiling below the boiling point of the solvent. If it is desired to recycle unconverted hydrocarbons the portion of the reaction mixture boiling below the boiling range of the desired product may be separated for recycling as such, or an intermediate fraction including the solvent-catalyst solution and hydrocarbons desired for recycling may be separated and returned to the entrance of the pipe coil.

We claim:

1. A method for carrying out liquid phase catalytic reactions involving a hydrocarbon reactant and catalyst comprising two immiscible ingredients which comprises dissolving said reactant and catalyst in a normally liquid solvent consisting essentially of carbon halides containing at most a minor proportion of halogen atoms other than fluorine and containing in each molecule at least six fluorine atoms for each halogen atom other than fluorine, and maintaining said solution at suitable reaction conditions for a time effective to complete the desired catalytic reaction.

2. A method for carrying out liquid phase catalytic reactions involving a hydrocarbon reactant and catalyst comprising two immiscible ingredients which comprises dissolving said reactant and catalyst in a normally liquid solvent consisting essentially of substantially completely halogenated hydrocarbons containing at most minor proportions of halogen atoms other than fluorine, and containing in each molecule at least six fluorine atoms for each halogen atom other than fluorine, and less than two weight per cent of hydrogen, and maintaining said solution at suitable reaction conditions for a time effective to complete the desired catalytic reaction.

3. A method for carrying out liquid phase catalytic reactions involving a hydrocarbon reactant and catalyst comprising two immiscible ingredients which comprises dissolving said reactant and catalyst in a normally liquid solvent consisting essentially of fluorocarbons containing less than two weight per cent of hydrogen and containing in each molecule at least six fluorine atoms for each halogen atom other than fluorine, and maintaining said solution at suitable reaction conditions for a time effective to complete the desired catalytic reaction.

4. A method for carrying out liquid phase catalytic reactions involving a hydrocarbon reactant and catalyst comprising two immiscible ingredients which comprises dissolving said reactant and catalyst in a normally liquid solvent consisting essentially of carbon fluorides, and maintaining said solution at suitable reaction conditions for a time effective to complete the desired catalytic reaction.

5. A method for carrying out liquid phase catalytic reactions of a hydrocarbon involving an ingredient immiscible with said hydrocarbon which comprises dissolving said hydrocarbon and said immiscible ingredient in a normally liquid solvent consisting essentially of substantially completely halogenated hydrocarbons containing at most minor proportions of halogen atoms other than fluorine, and containing in each molecule at least six fluorine atoms for each halogen atom other than fluorine, and less than two weight per cent of hydrogen, and maintaining said solution at suitable reaction conditions for a time effective to complete the desired catalytic reaction.

6. A method for carrying out liquid phase catalytic hydrocarbon reactions involving a catalyst immiscible with said hydrocarbons which comprises dissolving said hydrocarbons and catalyst in a normally liquid solvent consisting essentially of substantially completely halogenated hydrocarbons containing at most minor proportions of halogen atoms other than fluorine, and containing in each molecule at least six fluorine atoms for each halogen atom other than fluorine, and less than two weight per cent of hydrogen, and maintaining said solution at suitable reaction conditions for a time effective to complete the desired catalytic reaction.

7. A method for carrying out liquid phase catalytic hydrocarbon reactions involving a catalyst comprising a catalytic inorganic halide which comprises dissolving said hydrocarbon reactants and catalytic inorganic halide in a normally liquid solvent consisting essentially of substantially completely halogenated hydrocarbons containing at most minor proportions of halogen atoms other than fluorine, and containing in each molecule at least six fluorine atoms for each halogen atom other than fluorine, and less than two weight per cent of hydrogen, and maintaining said solution at suitable reaction conditions for a time effective to complete the desired catalytic reaction.

8. A method for treating paraffin hydrocarbons and poly-alkylated cyclic hydrocarbons to effect isomerization thereof by shifting the position of an alkyl group in the molecule which comprises dissolving said hydrocarbon and an inorganic halide isomerizing catalyst in a normally liquid solvent consisting essentially of substantially completely halogenated hydrocarbons comprising at most minor proportions of halogen atoms other than fluorine, and containing in each molecule at least six fluorine atoms for each halogen atom other than fluorine, and less than two weight per cent of hydrogen, and maintaining said solution at suitable isomerizing reaction conditions for a time effective to complete the desired isomerizing reaction.

9. A method for treating paraffin hydrocarbons to effect isomerization thereof which comprises dissolving said paraffin hydrocarbons and an isomerizing catalyst comprising aluminum trichloride and hydrogen chloride in a normally liquid solvent consisting essentially of substantially completely halogenated hydrocarbons containing at most minor proportions of halogen atoms other than fluorine and less than two weight per cent of hydrogen, and maintaining said solution at suitable reaction conditions for a time effective to complete the desired catalytic reaction.

10. A method for treating olefin hydrocarbons to effect condensation thereof which comprises dissolving said olefin hydrocarbons and an inorganic halide condensation catalyst in a normally liquid solvent consisting essentially of substantially completely halogenated hydrocarbons containing at most minor proportions of halogen atoms other than fluorine and less than two weight per cent of hydrogen, and maintaining said solution at suitable reaction conditions for a time effective to complete the desired catalytic reaction.

11. A method for treating high-boiling hydrocarbons to effect cracking thereof to lower boiling hydrocarbons in the gasoline boiling range which comprises dissolving said high-boiling hydrocarbons and an inorganic halide cracking catalyst in a normally liquid solvent consisting essentially of substantially completely halogenated hydrocarbons containing at most minor proportions of halogen atoms other than fluorine and less than two weight per cent of hydrogen, and maintaining said solution at suitable reaction conditions for a time effective to complete the desired reaction.

12. A method for carrying out liquid phase catalytic hydrocarbon reactions involving the use of an aluminum halide catalyst which comprises dissolving said hydrocarbon reactants and aluminum halide in a normally liquid solvent consisting essentially of substantially completely halogenated hydrocarbons containing at most minor proportions of halogen atoms other than fluorine and less than two weight per cent of hydrogen, and maintaining said solution at suitable reaction conditions for a time effective to complete the desired catalytic reaction.

13. A method for carrying out liquid phase catalytic hydrocarbon reactions involving the use of an aluminum chloride catalyst which comprises dissolving said hydrocarbon reactants and aluminum chloride in a normally liquid solvent consisting essentially of substantially completely halogenated hydrocarbons containing at most minor proportions of halogen atoms other than fluorine and less than two weight per cent of hydrogen, and maintaining said solution at suitable reaction conditions for a time effective to complete the desired catalytic reaction.

14. A method for carrying out liquid phase catalytic hydrocarbon reactions involving the use of a catalyst comprising an aluminum halide and a hydrogen halide which comprises dissolving said hydrocarbon reactants and said catalyst in a normally liquid solvent consisting essentially of substantially completely halogenated hydrocarbons containing at most minor proportions of halogen atoms other than fluorine and less than two weight per cent of hydrogen, and maintaining said solution at suitable reaction conditions for a time effective to complete the desired catalytic reaction.

15. A method for carrying out liquid phase catalytic hydrocarbon reactions which involve the use of a hydrogen fluoride catalyst which comprises dissolving said hydrocarbon reactants and hydrogen fluoride in a normally liquid solvent consisting essentially of substantially completely halogenated hydrocarbons containing at most minor proportions of halogen atoms other than fluorine and less than two weight per cent of hydrogen, and maintaining said solution at suitable reaction conditions for a time effective to complete the desired catalytic reaction.

16. A method for carrying out liquid phase catalytic hydrocarbon reactions involving the use of a catalyst comprising hydrogen fluoride and boron tri-fluoride which comprises dissolving said hydrocarbon reactants and said catalyst in a normally liquid solvent consisting essentially of substantially completely halogenated hydrocarbons containing at most minor proportions of halogen atoms other than fluorine, and containing in each molecule at least six fluorine atoms for each halogen atom other than fluorine, and less than two weight per cent of hydrogen, and maintaining said solution at suitable reaction conditions for a time effective to complete the desired catalytic reaction.

17. A method for carrying out liquid phase catalytic hydrocarbon reactions involving the use of a catalyst comprising boron tri-fluoride which comprises dissolving said hydrocarbon reactants and boron tri-fluoride in a normally liquid solvent consisting essentially of substantially completely halogenated hydrocarbons containing at most minor proportions of halogen atoms other than fluorine, and containing in each molecule at least six fluorine atoms for each halogen atom other than fluorine, and less than two weight per cent of hydrogen, and maintaining said solution at suitable reaction conditions for a time effective to complete the desired catalytic reaction.

18. A method for treating paraffin hydrocarbons to effect isomerization thereof which comprises dissolving said paraffin hydrocarbons and an isomerizing catalyst comprising an aluminum halide and a hydrogen halide in a normally liquid solvent consisting essentially of substantially completely halogenated hydrocarbons containing at most minor proportions of halogen atoms other than fluorine and less than two weight per cent of hydrogen, and maintaining said solution at suitable reaction conditions for a time effective to complete the desired catalytic reaction.

19. A method for treating paraffin hydrocarbons to effect isomerization thereof which comprises dissolving said paraffin hydrocarbons and an isomerizing catalyst comprising hydrogen fluoride and boron trifluoride in a normally liquid solvent consisting essentially of substantially completely halogenated hydrocarbons containing at most minor proportions of halogen atoms other than fluorine, and containing in each molecule at least six fluorine atoms for each halogen atom other than fluorine, and less than two weight per cent of hydrogen, and maintaining said solution at suitable reaction conditions for a time effective to complete the desired catalytic reaction.

HERBERT J. PASSINO.
JOHN S. REARICK.

REFERENCES CITED

The following references are of record in the file of this patent:

UNITED STATES PATENTS

| Number | Name | Date |
| --- | --- | --- |
| 2,146,667 | Atwell | Feb. 7, 1939 |
| 2,162,682 | Terres et al. | June 13, 1939 |
| 2,163,564 | Terres et al. | June 20, 1939 |
| 2,076,201 | Langedijk et al. | Apr. 6, 1937 |
| 2,172,146 | Ruthruff | Sept. 5, 1939 |
| 2,185,405 | Fleming et al. | Jan. 2, 1940 |
| 2,283,142 | Ipatieff | May 12, 1942 |
| 2,347,317 | Gibson | Apr. 25, 1944 |
| 2,361,452 | Brown | Oct. 31, 1944 |
| 2,363,264 | Rosen | Nov. 1, 1944 |
| 2,220,307 | Whiteley, Jr., et al. | Nov. 5, 1940 |
| 2,320,629 | Matuszak | June 1, 1943 |
| 2,367,535 | Sowa | Jan. 16, 1945 |

FOREIGN PATENTS

| Number | Country | Date |
| --- | --- | --- |
| 459,003 | Great Britain | Nov. 3, 1942 |